United States Patent
DuPont

[15] 3,643,987
[45] Feb. 22, 1972

[54] SPOUT STRUCTURE

[72] Inventor: Ronal Charles DuPont, London, Ontario, Canada

[73] Assignee: GSW Limited-GSW Limitee, Toronto, Ontario, Canada

[22] Filed: Sept. 11, 1970

[21] Appl. No.: 71,325

[52] U.S. Cl. ............................................. 285/205, 85/36
[51] Int. Cl. ................................................. F16l 5/00
[58] Field of Search ............... 285/205, 208, 209, 162, 196; 85/36; 16/2

[56] References Cited

UNITED STATES PATENTS

| | | |
|---|---|---|
| 3,116,362 | 12/1963 | Rankin ............................................. 16/2 X |
| 1,890,348 | 12/1932 | Weatherhead, Jr. ........................ 16/2 UX |
| 2,889,089 | 6/1959 | Herrick et al. ......................... 285/205 X |
| 2,180,960 | 11/1939 | Kennedy ............................... 285/205 X |
| 1,179,648 | 4/1916 | Personette ............................. 85/36 UX |
| 2,312,379 | 3/1943 | Bechik .................................. 85/36 UX |
| 1,483,218 | 2/1924 | Fahnestock ............................ 16/2 UX |

*Primary Examiner*—Andrew V. Kundrat
*Attorney*—Douglas S. Johnson

[57] ABSTRACT

A spout structure for liquid receptacles having an opening in a wall consists of a tube extending through the opening, a gasket on the inside of the wall surrounding said opening, a flange at one end of the tubular member engaging the gasket having a ledge on the tubular member outward of the wall and a dished resilient ring bearing against the ledge and the wall, the ring having legs which can be sprung apart to enable it to pass over the ledge and fixed into position.

2 Claims, 2 Drawing Figures

INVENTOR.
RONAL C. DuPONT

BY Douglas S. Johnson
Attorney

SPOUT STRUCTURE

Field of the Invention

This invention relates to spouts and has particular reference to attaching a spout to the tub of an automatic washing machine to provide for attachment to a flexible hose.

Prior Art

A common method of providing a spout to an automatic washer is to weld a metal tube to the tank with subsequent application of a corrosion resistant finish to the assembled tank and tube. This is an expensive procedure and is particularly susceptible to leakage because of the difficulty of welding the tube to the thin metal of the tank. Despite the utmost care during welding, and the subsequent application of a corrosion resistant finish, corrosion at the welded joint is a common occurrence.

Mechanical connection of a spout to a tank has been previously proposed in a number of ways for instance, U.S. Pat. No. 2,180,960 shows the attachment of a nipple to a tank, the nipple being provided with a walking shoulder which cooperates with a resilient ring to hold the nipple against the wall of the tank. However, the sealing attachment is also dependent on the application of cementitious material on both the nipple and the ring which cementitious material generally changes with age and adopts a permanent set; the material may eventually become so brittle that the application of even a slight force causes breakage.

SUMMARY OF THE INVENTION

Applicant has now devised a simple mechanical spout structure which automatically compensates for any permanent set in the gasket material and in practice can only be disengaged after assembly, through the use of considerable force, of an extent enough to damage the spout and tank; the corrosion problems associated with welding are eliminated with applicant's structure.

The spout structure of the present invention consists of a tube which is inserted from one side through a hole in the tank. The tube which may be made of plastic or metal is provided with a flange having a diameter larger than the diameter of the hole, which flange bears against a cooperating gasket which surrounds the tube on the wall of the tank. The portion of the tube projecting through the hole is provided with a ledge which has a face directed towards the tank. A dished ring made of resilient material and having a plurality of legs with an internal diameter in that region slightly less than the external diameter of the ledge is forced over the latter. The depth of the ring is greater than the distance between the wall of the tank and the outwardly disposed ledge with the result that the body of the dished ring removed from the legs bears against the tank thus forcing the inwardly disposed flange of the spout to seal on the gasket while the extremities of the legs bear against the face of the ledge.

BRIEF DESCRIPTION OF THE DRAWINGS

The invention will now be described in relation to the accompanying drawings in which.

DESCRIPTION OF THE PREFERRED EMBODIMENT

Figure 1:
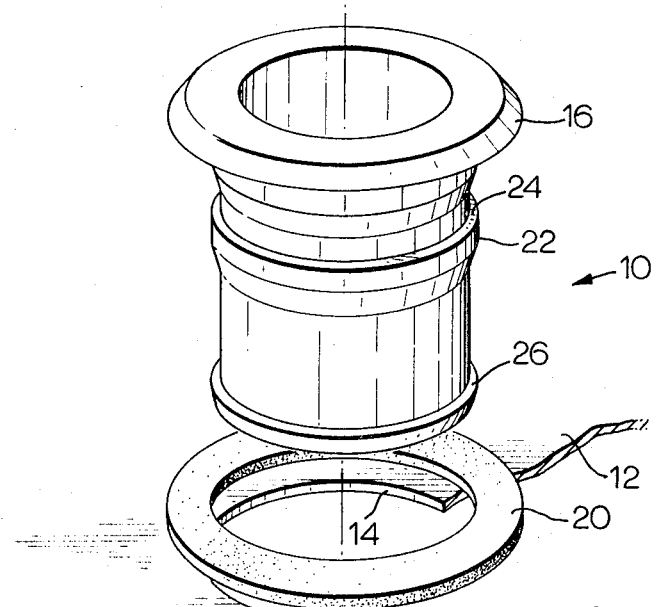
FIG. 1 is a perspective view of the parts of the spout structure in separated juxtaposition to each other and to a fragmentary portion of the wall of a liquid receptacle such as the tub of an automatic washer.

Referring now to the drawings, the spout structure includes a member 10 which may be constructed with substantially rigid material such as plastic or metal, which member has a longitudinally extending wall therethrough defining a passageway for passage of liquid in or out of a liquid receptacle of which only a fragmentary wall portion 12 is shown, the wall having a circular aperture 14.

The member 10 has an end flange 16 which is larger in diameter than the aperture 14 in the wall 12.

The spout structure also includes an annular gasket 20 which is positioned around the aperture 14 on the wall of the receptacle, with the body of the member 10 extending therethrough and the flange 16 bearing against the gasket 20.

The member 10 outward of the wall 12 is provided with a ledge 22 with the face 24 which connects it to the body of the member 10 being directed towards the wall 12, the ledge 22 is less in diameter than the aperture 14.

The external diameter of the ledge is less than the diameter of the aperture 14 in order to permit insertion of the member 10 through the aperture 14. The member 10 may have a flange 26 at the end removed from the flange 18 but this is purely for the purpose of facilitating the connection of a hose 28 and cooperating ring 30 shown in outline in FIG. 2.

The spout structure also includes an annular member generally denoted by the numeral 34, the body or connecting portion 36 of which is dish-shaped, tapering in a direction away from the receptacle wall 12. The body 36 of the member 34 has a plurality of legs 38. The internal diameter of the body or connecting portion 36 is greater than the external diameter of the ledge 22 whereas, the internal diameter in the region of the extremities of the legs 38 is less than the external diameter of the ledge 22. The member 34 is made of springlike material such as metal, i.e., steel, or plastic so that the legs 38 may be forced apart in the manner described below. The depth of the ring 34, i.e., the combined depth of the connecting portion 36 and the legs 38 is greater than the distance between the contacting surface of the wall 12 and the face 24 of the ledge 22 when the spout structure is assembled as described hereunder.

Figure 2:
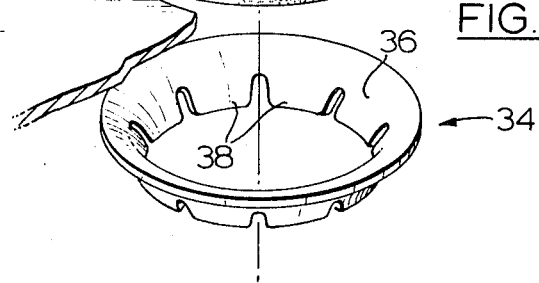
FIG. 2 is a sectional view of the parts shown in FIG. 1 in assembled position.
Figure 2:
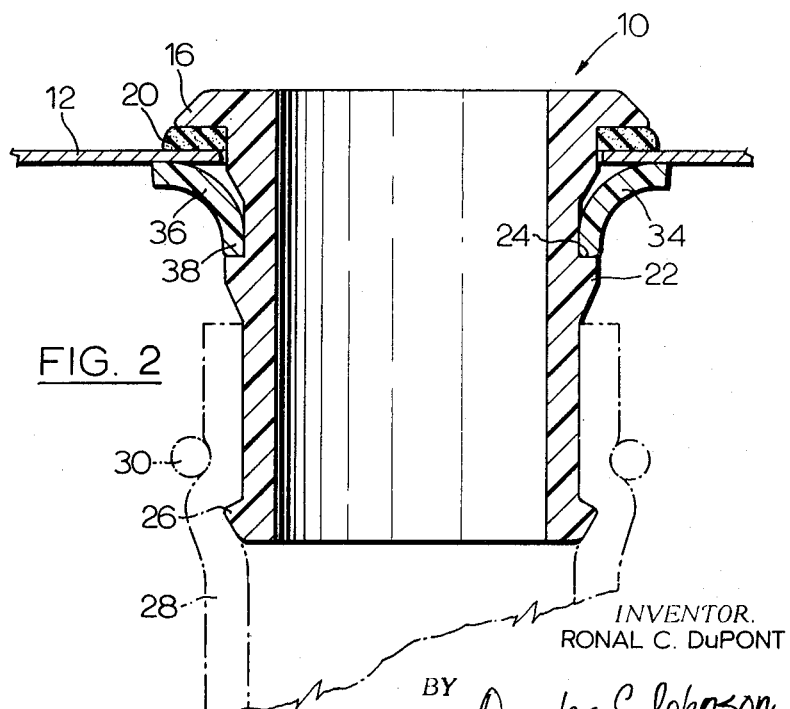

FIG. 2 shows the spout structure in the assembled position with the member 10 extending through the aperture 14 and the end flange 16 against the annular gasket 20 which, in turn is against the face of the wall 12. The ledge 22 is shown to be disposed outward of the wall 12 with the face 24 of the ledge 22 directed towards the wall 12.

To effect assembly, the annular member 34 is passed over the flange 26 with the body 36 of the member 34 leading the legs 38. The body 36 of the member 34 then passes over the ledge 22 because the internal diameter of the body 36 is greater than the external diameter of the ledge 22. Then inward pressure is applied to the annular member 34 and the flexible legs 38 are forced apart sufficiently for them to pass over the ledge 22 after which the legs 38 remain in a compressed position with their ends bearing against the face 24 of the ledge 22.

Because the combined depth of the body 36 and legs 38 of the annular member 34 is greater than the distance between the exterior of the wall 12 and the face 24 of the ledge 22, the resiliency of the annular member 34 will cause the body 36 to bear against the wall 12 and thus effect a seal, the inwardly disposed flange 16 being forced against the annular gasket 20 which in turn bears against the wall 12.

I claim:

1. A spout structure for liquid receptacles having an opening in a wall thereof, said spout structure including a tubular member extending through said opening, sealing gasket means surrounding said opening and engaging the inside of the wall of said receptacle, a flange at one end of said tubular member engaging said gasket, a ledge on said tubular member disposed outward of said wall and spaced therefrom, said ledge having a face disposed towards said wall, a dished ring of resilient material, said ring having a connecting portion with an internal diameter less than the external diameter of said ledge, said connecting portion having a plurality of legs with the internal diameter of the extremities of said legs less than the external diameter of said ledge, the height of said dished ring being greater than the distance from said face of said ledge to the outward side of said wall when said tubular member is first assembled through said opening, said ring embracing said tube and adapted to be compressed between the outer surface of said wall and the face of said ledge with said connecting portion bearing against said wall and the extremities of said legs bearing against said face to resiliently clamp and seal said flange against said gasket and a tapered wall portion on said tubular member extending from the outer surface of said wall to a point spaced from said ledge so as to allow compression of said dished ring opposite said sealing gasket means.

2. A spout structure according to claim 1, wherein said dished ring is made of spring steel.

* * * * *